(12) United States Patent
Vidal et al.

(10) Patent No.: US 11,991,055 B2
(45) Date of Patent: May 21, 2024

(54) TECHNIQUE FOR ANTICIPATING SERVICE LEVEL IMPACTS

(71) Applicant: Telefonaktiebolaget LM Ericsson (PUBL), Stockholm (SE)

(72) Inventors: Allan Vidal, Indaiatuba (BR); Pedro Henrique Gomes Da Silva, Sao Paulo SP (BR); Mateus Santos, Sao Paulo (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 61 days.

(21) Appl. No.: 17/607,140

(22) PCT Filed: Apr. 30, 2019

(86) PCT No.: PCT/EP2019/061012
§ 371 (c)(1),
(2) Date: Oct. 28, 2021

(87) PCT Pub. No.: WO2020/221433
PCT Pub. Date: Nov. 5, 2020

(65) Prior Publication Data
US 2022/0217059 A1 Jul. 7, 2022

(51) Int. Cl.
*H04L 41/147* (2022.01)
*H04L 41/5009* (2022.01)
*H04L 41/5025* (2022.01)

(52) U.S. Cl.
CPC ........ *H04L 41/5025* (2013.01); *H04L 41/147* (2013.01); *H04L 41/5009* (2013.01)

(58) Field of Classification Search
CPC ............... H04L 41/5025; H04L 41/147; H04L 41/5009; H04L 41/122; H04L 41/40;
(Continued)

(56) References Cited

U.S. PATENT DOCUMENTS

2014/0199980 A1 7/2014 Rao et al.
2015/0281303 A1 10/2015 Yousef et al.
(Continued)

OTHER PUBLICATIONS

ETSI TS 123 501 v15.3.0; 5G; System Architecture for the 5G System (3GPP TS 23.501 version 15.3.0 Release 15) (due to size, this reference has been split into eight parts)—Sep. 2018.
(Continued)

*Primary Examiner* — Karen C Tang
(74) *Attorney, Agent, or Firm* — Baker Botts L.L.P.

(57) ABSTRACT

A technique for anticipating impacts on service levels of one or more services provided to a User Equipment, UE, while the UE moves along a planned route is disclosed, wherein each of the one or more services is provided to the UE using a network slice in a network slicing based mobile communication system. A method implementation of the technique is performed by an anticipation component and comprises receiving (S202) a service level anticipation request for the planned route of the UE, triggering (S204) determining an expected impact on the service levels of the one or more services at one or more locations of the planned route, and triggering (S206) sending a response to the service level anticipation request including information on the expected impact on the service levels.

10 Claims, 8 Drawing Sheets

(58) Field of Classification Search
CPC ... H04L 67/12; H04L 67/5681; G08G 1/0967; H04W 4/40
USPC ............................................................ 709/224
See application file for complete search history.

(56) References Cited

U.S. PATENT DOCUMENTS

| | | | |
|---|---|---|---|
| 2017/0086049 A1 | 3/2017 | Vrzic | |
| 2018/0007161 A1 | 1/2018 | Hwang et al. | |
| 2019/0394655 A1* | 12/2019 | Rahman | H04L 41/5058 |
| 2020/0195495 A1* | 6/2020 | Parker | H04L 41/082 |

OTHER PUBLICATIONS

3GPP TSG-SA WG2 Meeting #132; Xi'an, China; Change Request; Title: Solution #29 update: Source to WG: LG Electronics, Nokia, Nokia Shanghai Bell, Orange, Fraunhofer HHI, AT&T, Huawei, HiSilicon, Deutsche Telekom, Telecom Italia, Ericsson; Source to TSG: SA2 (S2-1904450 (Revision of S2-1904446, 4434, 3316))—Apr. 1-12, 2019.

PCT International Search Report issued for International application No. PCT/EP2019/061012—Dec. 20, 2019.

PCT Written Opinion of the International Searching Authority issued for International application No. PCT/EP2019/061012—Dec. 20, 2019.

3GPP TR 23.786 v16.0.0; Technical Report; 3rd Generation Partnership Project; Technical Specification Group Services and System Aspects; Study on architecture enhancements for the Evolved Packet System (EPS) and the 5G System (5GS) to support advanced V2X services (Release 16)—Mar. 2019.

3GPP TS 23.288 v0.4.0; Technical Specification; 3rd Generation Partnership Project; Technical Specification Group Services and System Aspects; Architecture enhancements for 5G System (5GS) to support network data analytics services (Release 16)—Apr. 2019.

* cited by examiner

| Network slice/Service (S-NSSAI) | Geographical area | Service level impact |
|---|---|---|
| SST=1, SD=45 (mobile broadband) | latlong(-23.11,-47.21), radius=10km | Bandwidth reduced to 10 Mbps |
| SST=2, SD=23 (ultra-reliable low latency communication) | latlong(-23.26,-47.31), radius=5km | Service unavailable |
| SST=3, SD=1 (massive IoT) | latlong(-23.26,-47.31), radius=5km | Minimum latency increases to 5 ms. |

TECHNIQUE FOR ANTICIPATING SERVICE LEVEL IMPACTS

PRIORITY

This nonprovisional application is a U.S. National Stage Filing under 35 U.S.C. § 371 of International Patent Application Serial No. PCT/EP2019/061012 filed Apr. 30, 2019 and entitled "Technique for Anticipating Service Level Impacts" which is hereby incorporated by reference in its entirety.

TECHNICAL FIELD

The present disclosure generally relates to systems using network slicing. In particular, a technique for anticipating impacts on service levels of one or more services provided to a User Equipment (UE) while the UE moves along a planned route is presented, wherein each of the one or more services is provided to the UE using a network slice in a network slicing based mobile communication system. The technique may be embodied in methods, computer programs, apparatuses and systems.

BACKGROUND

In mobile communication systems of the fifth generation (5G), the concept of network slices has been introduced. Network slices generally provide means for a network to provide different guarantees and service levels to a single UE. A network slice corresponds to a logical network that can be dynamically created and which may serve a particular service with an agreed upon service level. Each network slice may uniquely be identified using so called Single Network Slice Selection Assistance Information (S-NSSAI) and slice information may be exchanged between the UE and the network in the form of so called Network Slice Selection Assistance Information (NSSAI), which corresponds to a collection of S-NSSAIs. According to the current 3GPP standard (Release 15), up to eight S-NSSAIs may be included in an NSSAI so that a UE can be served by a maximum of eight network slices at the same time. To use one or more services, the UE may send an NSSAI to the network based on which related network slices may then be selected, i.e., the UE may specify its desired network slices through an NSSAI and the network may then use functions, such as an Access and Mobility Management Function (AMF) and/or a Network Slice Selection Function (NSSF), to select Network Slice Instances (NSIs) to serve the UE.

An S-NSSAI may comprise a Slice/Service type (SST) defining the expected network slice behavior and, optionally, a Slice Differentiator (SD) providing further differentiation enabling to differentiate among plural network slices of the same SST. SSTs may comprise standard SSTs (i.e., SSTs defined in a standard) or custom SSTs defined proprietarily by operators, for example. In 3GPP TS 23.501, for example, three standard SSTs are defined, which include enhanced Mobile Broadband (eMBB) having an SST value of 1, Ultra-Reliable Low Latency Communications (URLLC) having an SST value of 2 and Massive Internet of Things (MIoT) having an SST value of 3. An eMBB slice may be suitable for general consumer space mobile broadband applications including streaming of high quality video or fast large file transfers, for example. A URLLC slice may support ultra-reliable low latency communications for applications including industrial automation or (remote) control systems, for example. An MIoT slice may allow the support of a large number and high density of IoT devices in an efficient manner.

Movable UEs may experience varying service levels of the services provided by network slices as they move. Connected vehicles functioning as UEs, for example, may have access to network services on top of a Public Land Mobile Network (PLMN) managed by an operator. Typical vehicles have ample freedom of movement, potentially covering large areas outside the coverage of a single PLMN, in which case roaming may be necessary. Even within a single PLMN, network services may vary a lot. As such, services provided by network slices may have different characteristics (e.g., throughput) in different locations of the same network and, in remote areas, services may even be unavailable at all. For some types of UEs (e.g., connected vehicles) the corresponding service level changes may imply loss of connectivity, bandwidth reduction (e.g., for infotainment systems), or even reduced autonomous driving capabilities due to lack of ultra-reliable low latency communication, for example.

SUMMARY

Accordingly, there is a need for technique for use in a network slicing based mobile communication system which avoids one or more of the problems discussed above, or other problems.

According to a first aspect, a method for anticipating impacts on service levels of one or more services provided to a UE while the UE moves along a planned route is provided, wherein each of the one or more services is provided to the UE using a network slice in a network slicing based mobile communication system. The method is performed by an anticipation component and comprises receiving a service level anticipation request for the planned route of the UE, triggering determining an expected impact on the service levels of the one or more services at one or more locations of the planned route, and triggering sending a response to the service level anticipation request including information on the expected impact on the service levels.

The expected impact on the service levels may be determined based on network slice selection information of the UE defining, for each of the one or more services, a network slice to be used for providing the respective service to the UE while the UE moves along the planned route. The network slice selection information may correspond to an NSSAI which includes, for each network slice to be used for providing the respective service to the UE, an S-NSSAI defining the respective network slice. The network slice selection information may be included in the service level anticipation request.

Determining the expected impact on the service levels may include determining, for each pair among the one or more services and the one or more locations, an expected impact on the service level of the respective service at the respective location. Determining the expected impact on the service levels may include accessing one or more databases storing information on network slices and service levels associated with the network slices in different geographical regions. The anticipation component may be associated with a service provider providing the one or more services to the UE, wherein determining the expected impact on the service levels may include obtaining information on the expected impact on the service levels from at least one anticipation component associated with another service provider providing the one or more services to the UE while the UE moves along the planned route.

The information on the expected impact on the service levels included in the response to the service level anticipation request may comprise, for each of the one or more services for which a negative impact on its service level is determined in at least one geographical region, an indication of the at least one geographical region and an indication of the expected negative impact on the service level of the respective service in the at least one geographical region. The anticipation component may be implemented in one of a Network Function (NF) of the mobile communication system, and a server external to the mobile communication system.

According to a second aspect, a method for anticipating impacts on service levels of one or more services provided to a UE while the UE moves along a planned route is provided, wherein each of the one or more services is provided to the UE using a network slice in a network slicing based mobile communication system. The method is performed by the UE and comprises sending a service level anticipation request for the planned route to an anticipation component, the service level anticipation request requesting the anticipation component to determine an expected impact on the service levels of the one or more services along the planned route, and receiving a response from the anticipation component including information on the expected impact on the service levels.

The method according to the second aspect defines a method from the perspective of a UE which may be complementary to the method performed by the anticipation component according to the first aspect. The UE and the anticipation component of the second aspect may thus correspond to the UE and the anticipation component described above in relation to the first aspect.

The method may further comprise triggering at least one action based on the information on the expected impact on the service levels. The at least one action may comprise at least one of presenting the information on the expected impact on the service levels to a user of the UE, optionally as an alert, forwarding the information on the expected impact on the service levels to a dedicated application for further processing, and performing one or more preventive actions mitigating a negative impact on the service levels of the one or more services. The dedicated application may be a route planning application, wherein the at least one action further may comprise calculating an alternative route in which the one or more services are less negatively impacted. The one or more preventive actions may include downloading data to be provided to the UE as part of the one or more services while the UE moves along the planned route before the UE enters a geographical region in which a negative impact on the service levels of the one or more services is expected to occur.

As in the method of the first aspect, the expected impact on the service levels may be determined based on network slice selection information of the UE defining, for each of the one or more services, a network slice to be used for providing the respective service to the UE while the UE moves along the planned route. The network slice selection information may correspond to an NSSAI which includes, for each network slice to be used for providing the respective service to the UE, an S-NSSAI defining the respective network slice. The network slice selection information may be included in the service level anticipation request.

The information on the expected impact on the service levels included in the response from the anticipation component may comprise, for each of the one or more services for which a negative impact on its service level is determined in at least one geographical region, an indication of the at least one geographical region and an indication of the expected negative impact on the service level of the respective service in the at least one geographical region. The anticipation component may be implemented in one of an NF of the mobile communication system, and a server external to the mobile communication system.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit configured to execute an anticipation component for anticipating impacts on service levels of one or more services provided to a UE while the UE moves along a planned route is provided, wherein each of the one or more services is provided to the UE using a network slice in a network slicing based mobile communication system. The computing unit comprises at least one processor and at least one memory, wherein the at least one memory contains instructions executable by the at least one processor such that the anticipation component is operable to perform any of the method steps presented herein with respect to the first aspect.

According to a fifth aspect, a UE for anticipating impacts on service levels of one or more services provided to the UE while the UE moves along a planned route is provided, wherein each of the one or more services is provided to the UE using a network slice in a network slicing based mobile communication system. The UE comprises at least one processor and at least one memory, wherein the at least one memory contains instructions executable by the at least one processor such that the UE is operable to perform any of the method steps presented herein with respect to the second aspect.

According to a sixth aspect, there is provided a system comprising a computing unit according to the fourth aspect and a UE according to the fifth aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed to herein when executed by the one or more processors.

Figure 1A:
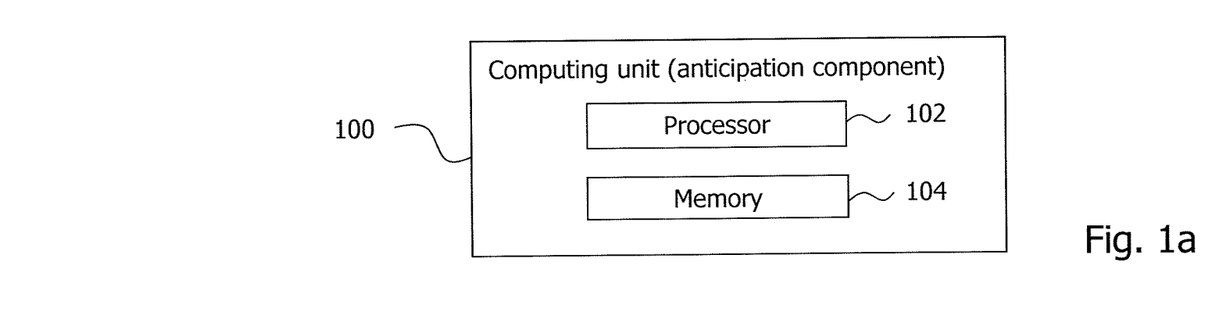
FIGS. 1a and 1b illustrate exemplary compositions of a computing unit configured to execute an anticipation component and a UE according to the present disclosure.

FIG. 1a schematically illustrates an exemplary composition of a computing unit 100 configured to execute an anticipation component for anticipating impacts on service levels of one or more services provided to a UE while the UE moves along a planned route, wherein each of the one or more services is provided to the UE using a network slice in a network slicing based mobile communication system. The computing unit 100 comprises at least one processor 102 and at least one memory 104, wherein the at least one memory 104 contains instructions executable by the at least one processor 102 such that the anticipation component is operable to carry out the method steps described herein below with reference to the anticipation component.

It will be understood that the computing unit 100 may be implemented on a physical computing unit or a virtualized computing unit, such as a virtual machine, for example. It will further be appreciated that the computing unit 100 may not necessarily be implemented on a standalone computing unit, but may be implemented as components realized in software and/or hardware residing on multiple distributed computing units as well, such as in a cloud computing environment, for example.

Figure 1B:
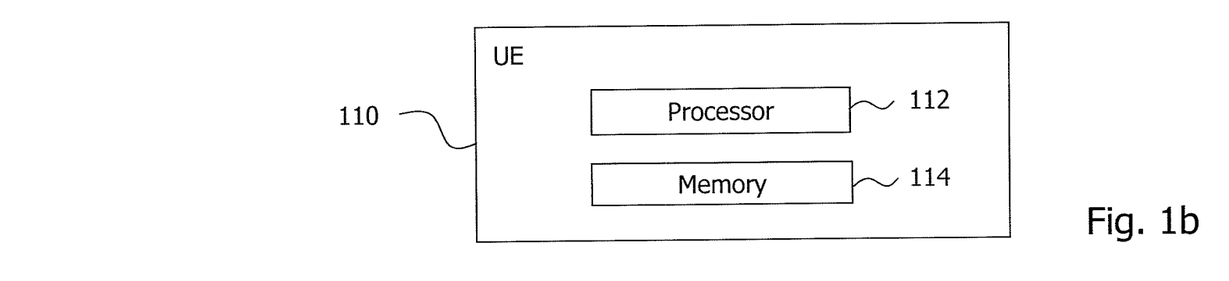

FIG. 1b schematically illustrates an exemplary composition of a UE 110 for anticipating impacts on service levels of one or more services provided to the UE 110 while the UE 110 moves along a planned route, wherein each of the one or more services is provided to the UE 110 using a network slice in a network slicing based mobile communication system. The UE 110 comprises at least one processor 112 and at least one memory 114, wherein the at least one memory 114 contains instructions executable by the at least one processor 112 such that the UE 110 is operable to carry out the method steps described herein below with reference to the UE.

Figure 2:
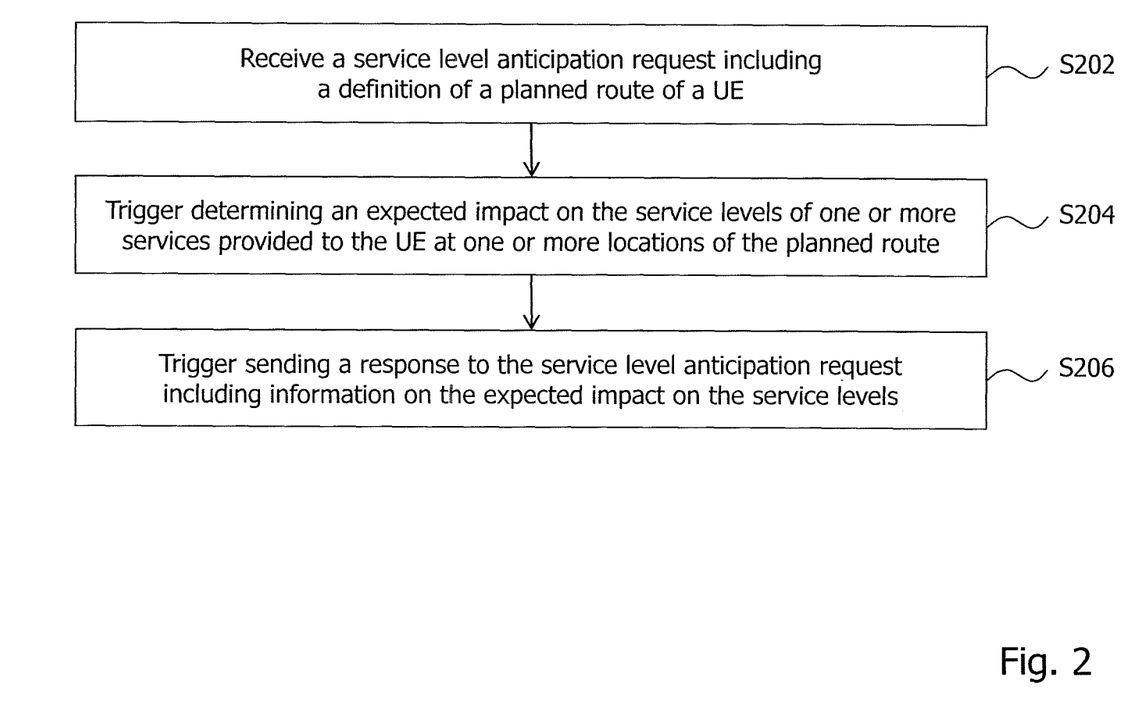
FIG. 2 illustrates a method which may be performed by the anticipation component according to the present disclosure.

FIG. 2 illustrates a method which may be performed by the anticipation component executed on the computing unit 100 according to the present disclosure. The method is dedicated to anticipating impacts on service levels of one or more services provided to a UE (e.g., the UE 110) while the UE moves along a planned route, wherein each of the one or more services is provided to the UE using a network slice in a network slicing based mobile communication system. In step S202, the anticipation component may receive a service level anticipation request for the planned route of the UE. In step S204, the anticipation component may trigger determining an expected impact on the service levels of the one or more services at one or more locations of the planned route. In step S206, the anticipation component may trigger sending a response to the service level anticipation request including information on the expected impact on the service levels.

In response to the service level anticipation request, the anticipation component may thus determine (or "estimate") how the service levels of the one or more services are expected to change when the UE moves along the planned route (e.g., over a large geographical area) and, by sending the response to the service level anticipation request, the anticipation component may provide information enabling the receiver of the response to take action, e.g., to mitigate or prevent negative impacts of reduced service levels in certain geographical areas of the planned route. The service level of a service may be representative of at least one Quality of Service (QoS) characteristic of the service, such as an available bandwidth or minimum latency by which the service is provided to the UE, or an availability/unavailability status of the service, for example.

In one variant, the service level anticipation request may be received from the UE and the response to the service level anticipation request may be sent to the UE. Using the service level anticipation request, the UE may thus connect to the anticipation component to learn about network slice coverage for its used services along the planned route, where network slice coverage may be understood as the availability of service levels supported by the network slices providing the one or more services in geographical areas. The one or more services provided to the UE may be communication services provided by Communication Service Providers (CSPs), for example, and may correspond to eMBB, URLLC or MIoT services, such as the ones described above.

The service level anticipation request may include a definition of the planned route, but it will be understood that the anticipation component may be supplied with information on the planned route through other ways, such as using a dedicated message separate from the service level anticipation request, for example. The definition of the planned route may correspond to an ordered list of locations (e.g., geographical longitude/latitude coordinates), for example, but it is conceivable that other data structures suitable for the representation of paths over geographical maps (or graphs) may be employed for the definition of the planned route as well. In one variant, the UE may be a vehicle connected to the mobile communication system, such as a vehicle having an infotainment system and/or supporting autonomous driving capabilities, for example, but it will be understood that the UE may be any other type of UE that is movable over a certain geographical area.

To be able to determine the expected impact on the service levels of the one or more services, the anticipation component may need to obtain information on which services are used by the UE and which network slices are used to provide these services to the UE. In one variant, such information may be derived from network slice selection information specified by the UE when the UE informs the network about its desired network slices, as described above. The expected impact on the service levels may thus be determined based on network slice selection information of the UE defining, for each of the one or more services, a network slice to be used for providing the respective service to the UE while the UE moves along the planned route. In one such variant, the network slice selection information may correspond to an NSSAI which includes, for each network slice to be used for providing the respective service to the UE, an S-NSSAI defining the respective network slice. The NSSAI and S-NSSAI may be defined as described above and an S-NSSAI may thus comprise an SST and, optionally, an SD, for example. While the network slice selection information may be included in the service level anticipation request, it will be understood that this information may also be obtained via other signaling messages (e.g., regularly) exchanged between the UE and the network.

Based on the planned route and the network slice selection information, the anticipation component may then estimate the service level impact for each location and network slice combination (e.g., for each combination of a location defined in the planned route and S-NSSAI defined in the network slice selection information). Determining the expected impact on the service levels may thus include determining, for each pair among the one or more services and the one or more locations, an expected impact on the service level of the respective service at the respective location. The expected impact on the service levels along the planned route may be determined based on information on network slices and their service levels (e.g., present and/or future service levels) in a given geographical location. Determining the expected impact on the service levels may thus include accessing one or more databases storing information on network slices and service levels associated with the network slices in different geographical regions. The one or more databases may correspond to network slice/NSI databases maintained by the mobile communication system, such as in a CSP core network (e.g., by an AMF or NSSF), for example.

As the planned route may span over a large geographical area that is not serviced by a single CSP but by plural CSPs so that roaming may be necessary when the UE moves from one CSP to another, the anticipation component may need in order to determine the expected impact on the service levels along the full planned route access to anticipation components of other CSPs servicing geographical areas that the UE may visit along the planned route, in order to thereby obtain network slice coverage information from other CSPs which the anticipation component would otherwise not have access to. The anticipation component may thus be associated with a service provider providing the one or more services to the UE, wherein determining the expected impact on the service levels may include obtaining information on the expected impact on the service levels from at least one anticipation component associated with another service provider providing the one or more services to the UE while the UE moves along the planned route.

The anticipation components of the other service providers may have the same configuration as the anticipation component described herein. Anticipation components of different service providers may in other words exchange information on the expected impact on the service levels so that the anticipation component described herein may determine the expected service impact along the full planned route. From the viewpoint of an anticipation component of another CSP, such anticipation component may similarly in accordance with steps S202, S204 and S206 receive a service level anticipation request, determine an expected impact on the service levels at one or more locations of the planned route (in this case, locations within the geographical area serviced by this CSP), and send a response including information on the determined expected impact. In this case, the service level anticipation request and the response may be received from and sent to the anticipation component described herein.

Figure 3:
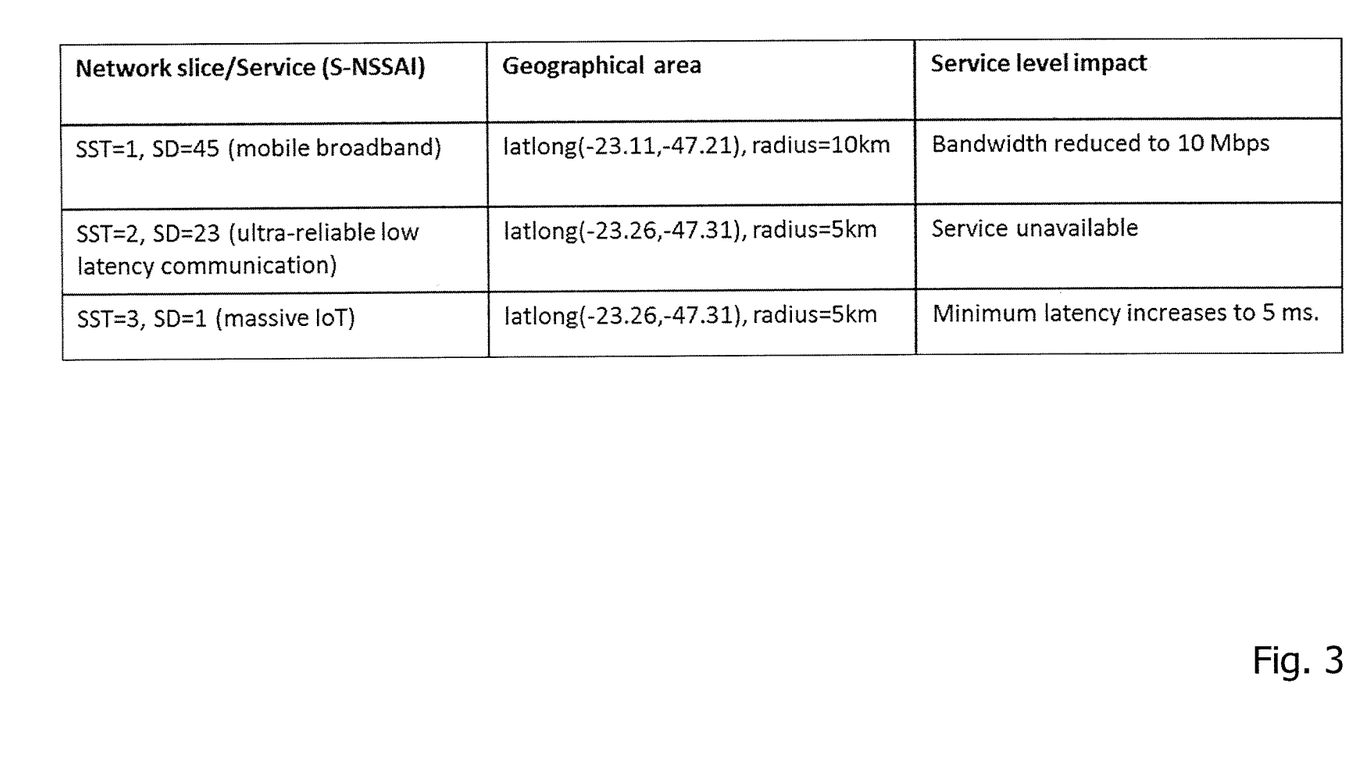
FIG. 3 illustrates an exemplary response to a service level anticipation request according to the present disclosure.

The information on the expected impact on the service levels included in the response to the service level anticipation request may comprise, for each of the one or more services for which a negative impact on its service level is determined in at least one geographical region, an indication of the at least one geographical region and an indication of the expected negative impact on the service level of the respective service in the at least one geographical region, as well as, optionally, an indication of the respective service. As an example, the response to the service level anticipation request may comprise a list of entries each containing a network slice identifier (e.g., an S-NSSAI including an SST and an SD), a location/geographical area in which the impact is expected to occur (e.g., specified by a longitude/latitude coordinate with a radius, a set of coordinates representing a polygon over a map, or the like), and a description of the service level impact (e.g., a textual/graphical/audible representation of the impact, or any other codification representing a quantitative or quantitative change, such as a degradation or an improvement, of the service level). An exemplary response is illustrated in FIG. 3, where service level impacts are indicated for exemplary eMBB, URLLC and MIoT services provided to the UE.

The anticipation component may generally be implemented as part of an existing network function of the mobile communication system, such as an AMF, or it may be exposed as a service (e.g., as a web service) over the Internet, such as a public web service running on a cloud external to the CSP network, for example. The anticipation component may as such be implemented in one of a Network Function, NF, of the mobile communication system, and a server external to the mobile communication system. The same may basically apply to the one or more databases storing the information on the network slices and their service levels. While such databases may be maintained by the mobile communication system, such as in a CSP core network, it will be understood that such databases may also be available from outside of the mobile communication system and its core network.

Figure 4:
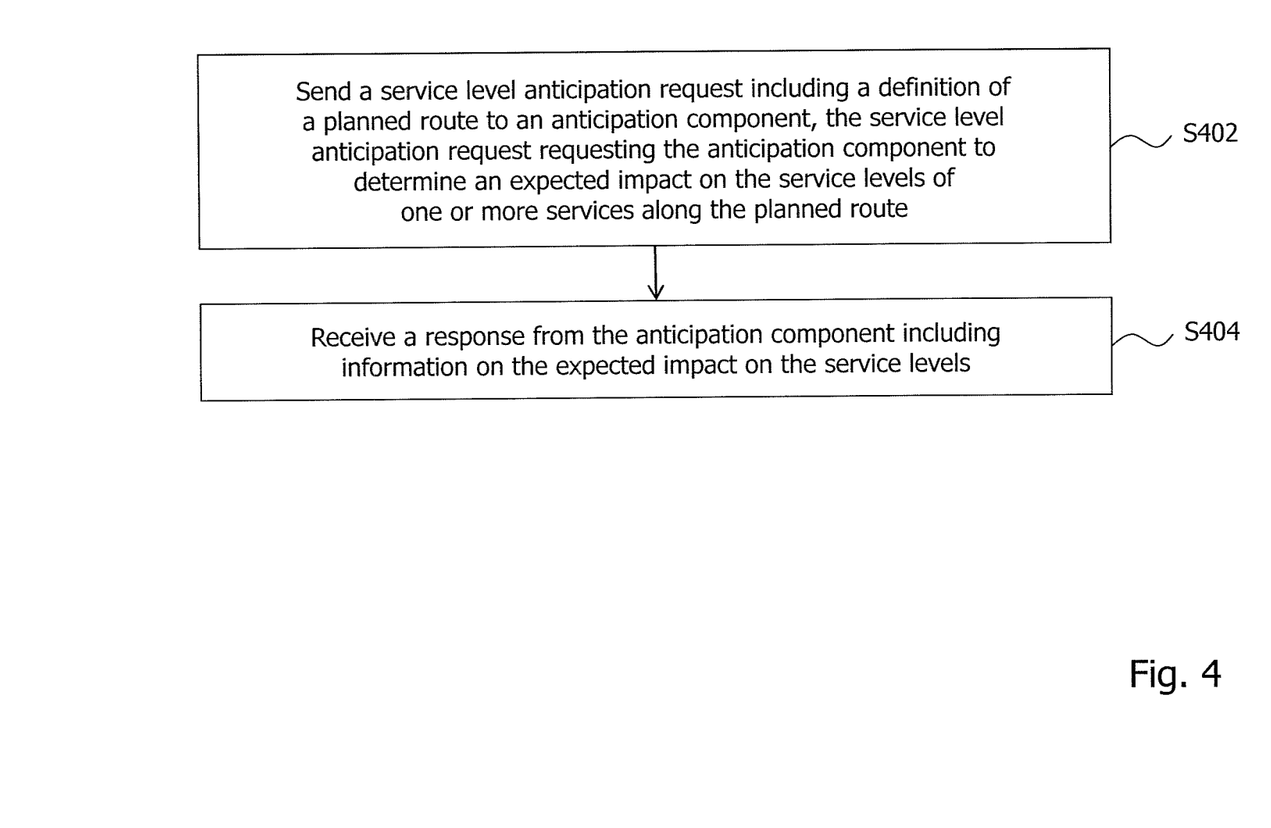
FIG. 4 illustrates a method which may be performed by the UE according to the present disclosure.

FIG. 4 illustrates a method which may be performed by the UE 110 according to the present disclosure. The method is dedicated to anticipating impacts on service levels of one or more services provided to the UE 110 while the UE 110 moves along a planned route, wherein each of the one or more services is provided to the UE 110 using a network slice in a network slicing based mobile communication system. The operation of the UE 110 may be complementary to the operation of the anticipation component described above in relation to FIG. 2 and, as such, aspects described above with regard to the operation of the UE may be applicable to the operation of the UE 110 described in the following as well, and vice versa. Unnecessary repetitions are thus omitted in the following.

In step S402, the UE 110 may send a service level anticipation request including a definition of the planned route to an anticipation component, the service level anticipation request requesting the anticipation component to determine an expected impact on the service levels of the one or more services along the planned route. In step S404, the UE 110 may receive a response from the anticipation component including information on the expected impact on the service levels.

As said, by sending the response to the service level anticipation request, the anticipation component may provide information enabling the UE 110 to take action, e.g., to mitigate or prevent negative impacts of reduced service levels in certain geographical areas of the planned route. The UE 110 may thus trigger at least one action based on the information on the expected impact on the service levels. The at least one action may comprise at least one of presenting the information on the expected impact on the service levels to a user of the UE, optionally as an alert, forwarding the information on the expected impact on the service levels to a dedicated application for further processing, and performing one or more preventive actions mitigating a negative impact on the service levels of the one or more services, for example.

Figure 5:
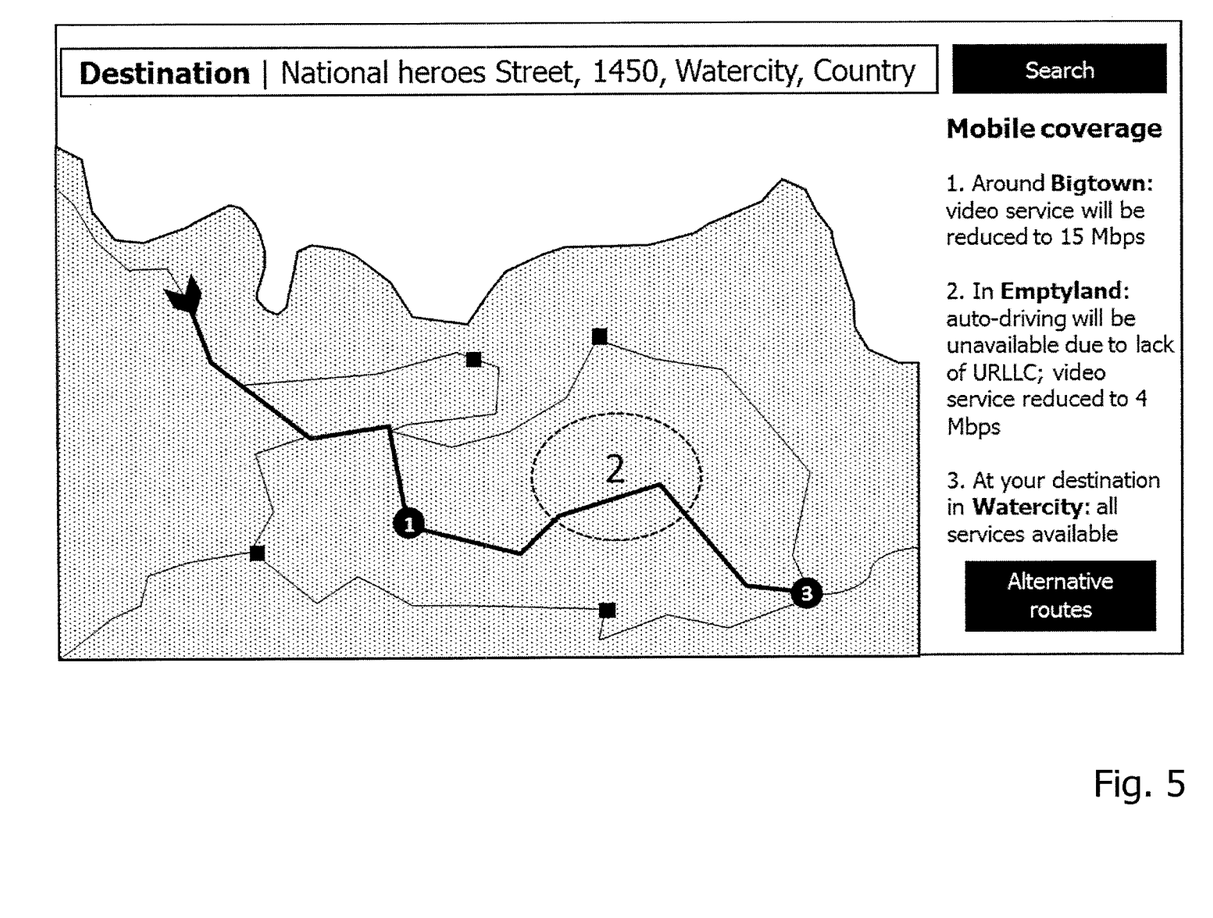
FIG. 5 illustrates an exemplary GUI display indicating areas along a planned route in which service level changes are expected to occur.

The UE may present the information included in the response to the user in a plurality of ways, such as via a graphical user interface (GUI) or via speakers, e.g., of an infotainment system in a connected vehicle, to thereby enable the user to manually take preventive actions. For example, the UE may determine when and where ultra-reliable low latency communication will be unavailable and alert drivers about the need for extra attention during the driving beforehand because driving assistance may be unavailable. FIG. 5 illustrates an example of such GUI display indicating areas along the planned route in which service level changes are expected to occur.

The UE may also take automated preventive actions itself. When the information on the expected impact on the service levels is forwarded to a dedicated application for further processing, for example, the UE may forward this information to a route planning application, enabling the route planning application to suggest alternative routes in which a given service may not be disrupted, for example. The dedicated application may thus be a route planning application, wherein the at least one action may further comprise calculating an alternative route in which the one or more services are less negatively impacted.

When the UE performs one or more preventive actions mitigating a negative impact on the service levels of the one or more services, the one or more preventive actions may include downloading data to be provided to the UE as part of the one or more services while the UE moves along the planned route before the UE enters a geographical region in which a negative impact on the service levels of the one or more services is expected to occur. For example, the UE may proactively download content in advance (e.g., buffering content) for a mobile broadband service if the information indicates that a given slice will be unavailable in certain locations.

As in the method described above in relation to FIG. 2, the expected impact on the service levels may be determined based on network slice selection information of the UE defining, for each of the one or more services, a network slice to be used for providing the respective service to the UE while the UE moves along the planned route. The network slice selection information may correspond to an NSSAI which includes, for each network slice to be used for providing the respective service to the UE, an S-NSSAI defining the respective network slice. The network slice selection information may be included in the service level anticipation request.

The information on the expected impact on the service levels included in the response from the anticipation component may comprise, for each of the one or more services for which a negative impact on its service level is determined in at least one geographical region, an indication of the at least one geographical region and an indication of the expected negative impact on the service level of the respective service in the at least one geographical region. The anticipation component may be implemented in one of an NF of the mobile communication system, and a server external to the mobile communication system.

Figure 6:
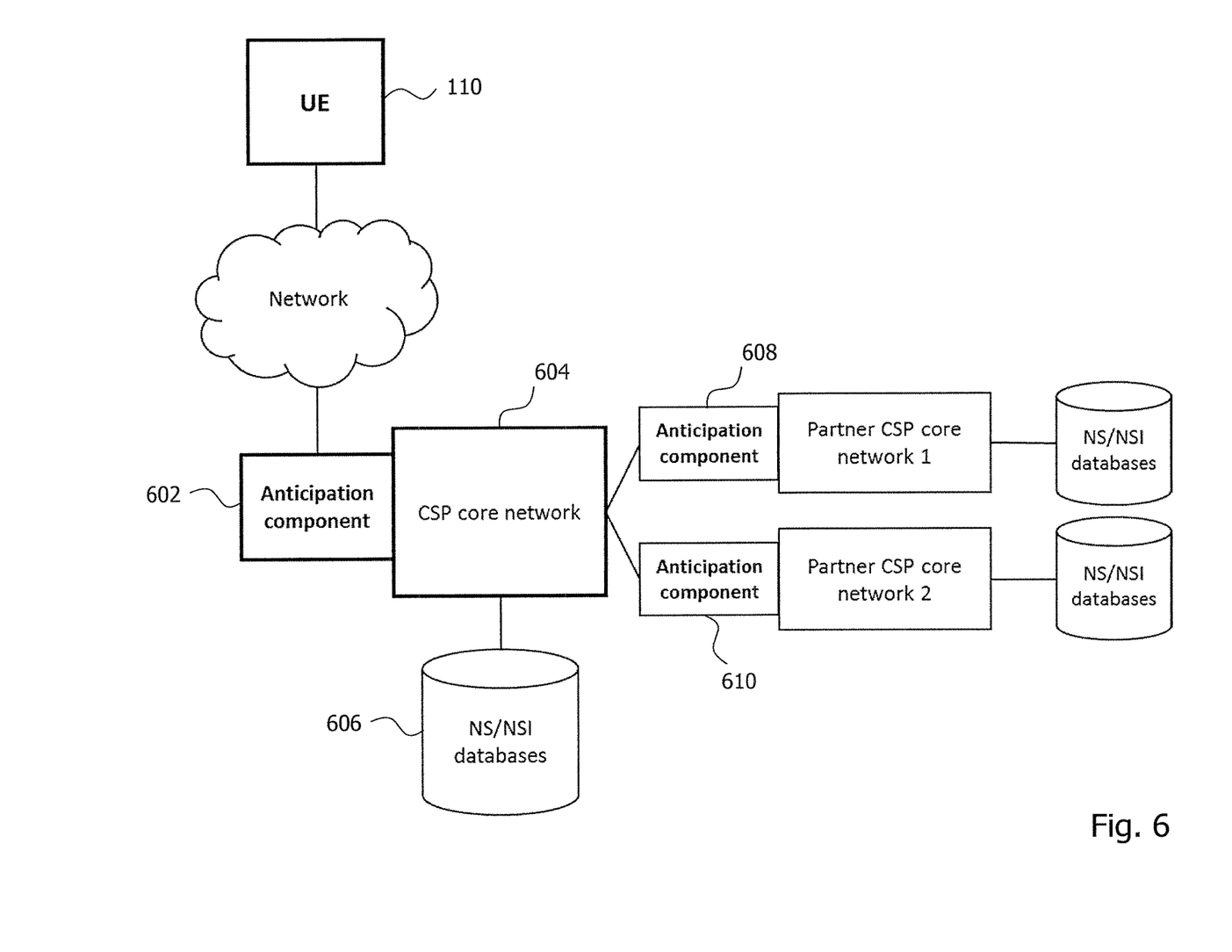
FIG. 6 illustrates an exemplary system comprising the UE and the anticipation component according to the present disclosure.

FIG. 6 illustrates an exemplary system comprising the UE 110 and an anticipation component 602 associated with a core network 604 of a CSP. As shown in the figure, the CSP core network 604 may maintain one or more network slice/NSI databases 606 storing information on network slices and their service levels in different geographical areas, which may be used by the anticipation component 602 to determine the expected impact on service levels along the planned route of the UE 110, as described above. If the planned route spans over a larger geographical area that is served by a plurality of CSPs so that roaming is necessary, the anticipation component 602 may access anticipation components associated with core networks of partner CSPs, as described above. These anticipation components are denoted by reference numerals 608 and 610 in the figure.

Figure 7:
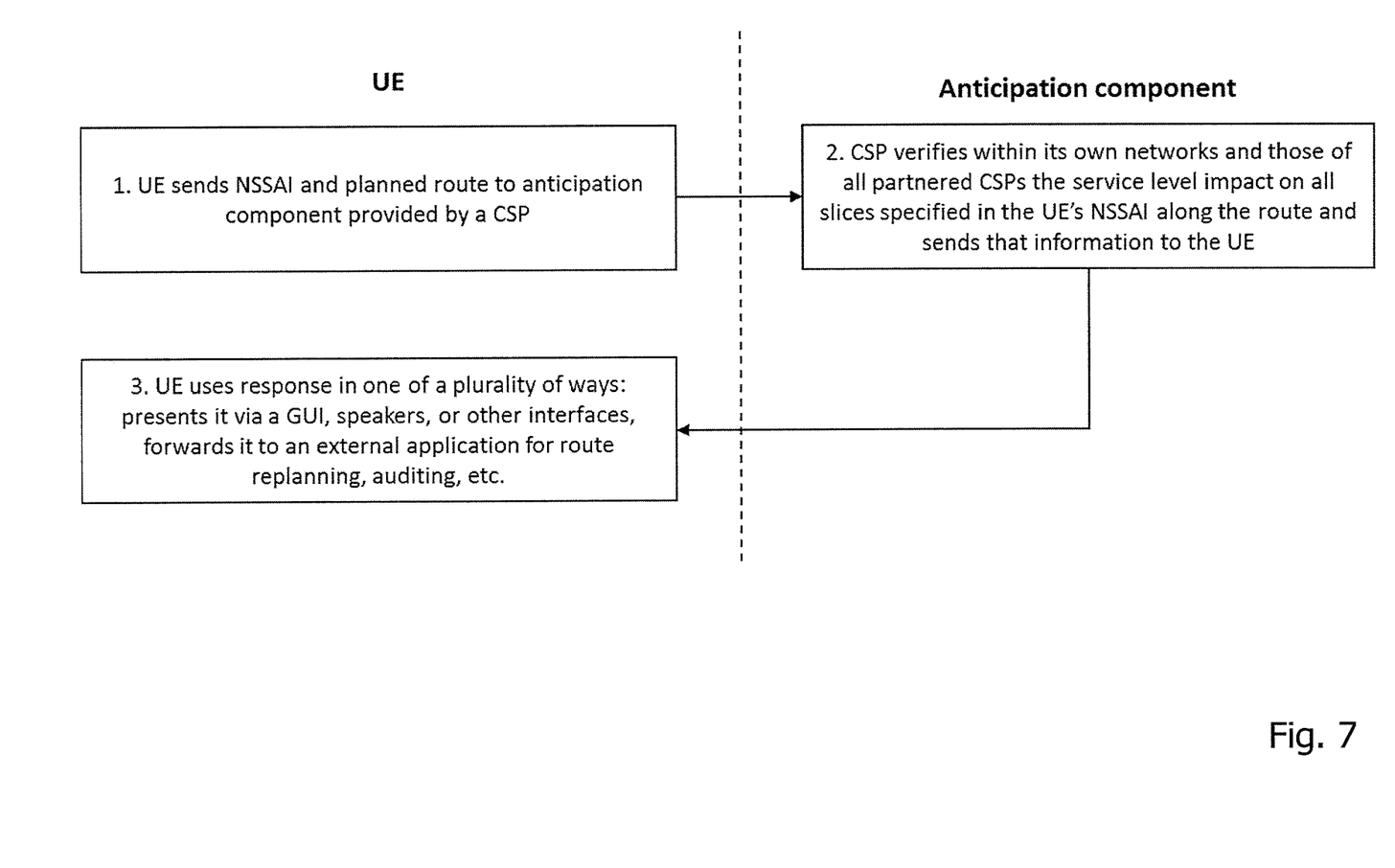
FIG. 7 illustrates an exemplary interaction between the UE and the anticipation component according to the present disclosure.

FIG. 7 illustrates an exemplary interaction between the UE 110 and the anticipation component 602 according to the present disclosure. In step 1 of the method, the UE may send an NSSAI as well as a definition of the planned route to the anticipation component 602 in the form of a service level anticipation request. Upon receipt of the request, the anticipation component 602 may verify (or "determine"), in step 2, within its own network as well as those of partnered CSPs, the expected service level impact on all network slices specified in the UE's NSSAI along the planned route and may send the determined information to the UE 110. In step 3, the UE 110 may use the response from the anticipation component 602 in one or more ways, such as presenting the information on a GUI or via speakers to the user, forwarding it to an external application for route replanning purposes, or the like.

Figure 8:
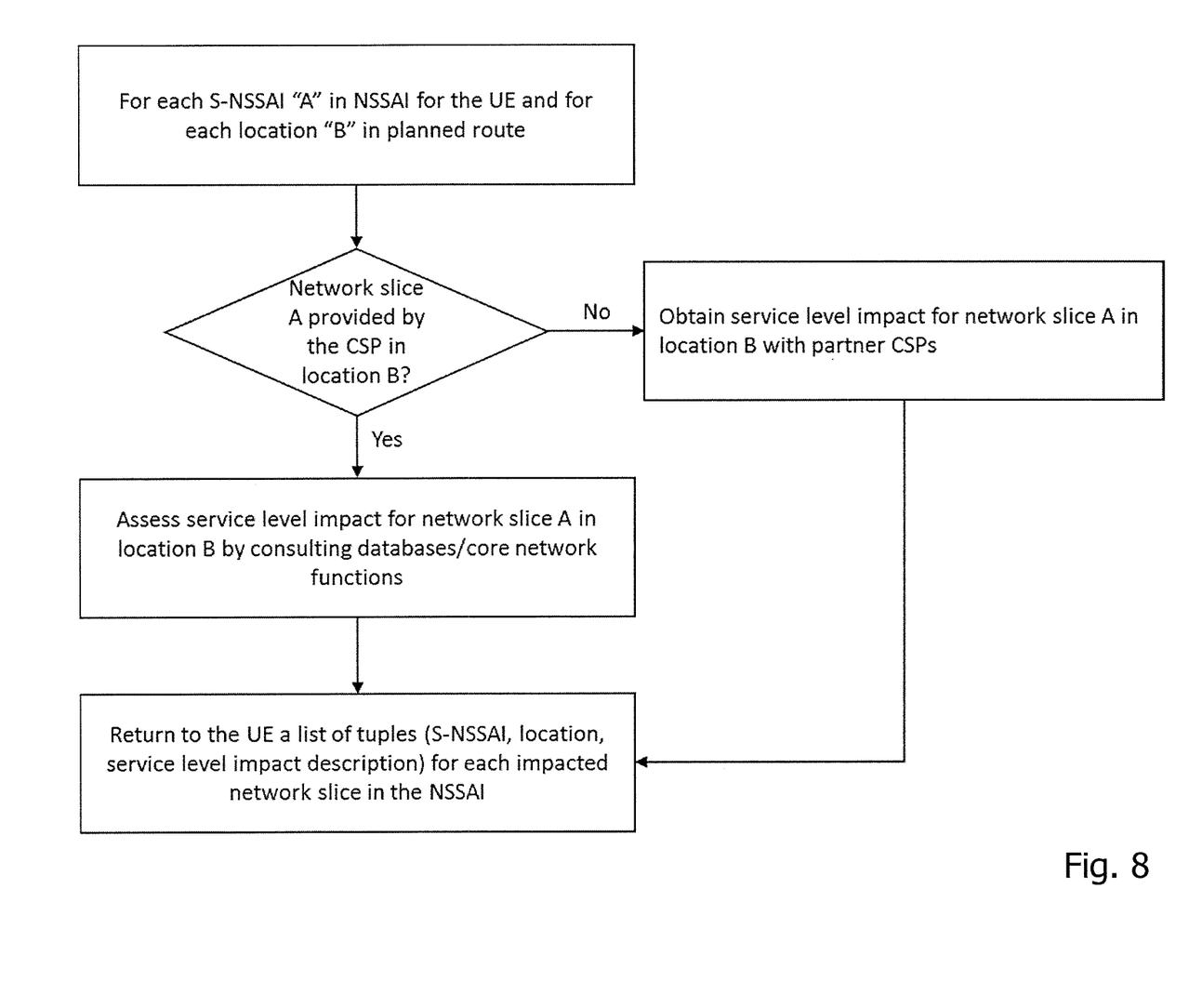
FIG. 8 illustrates an exemplary method which may be performed by the anticipation component in step 2 of FIG. 7.

FIG. 8 illustrates an exemplary method which may be performed by the anticipation component 602 in step 2 of FIG. 7. As shown in the figure, upon receipt of the service level anticipation request, the anticipation component 602 may determine, for each S-NSSAI "A" in the NSSAI included in the request and for each location "B" in the planned route, whether network slice A is provided by the CSP (itself) in location B. If it is determined that network slice A is provided by the CSP in location B, the anticipation component 602 may assess the service level impact for network slice A in location B by consulting the network slice/NSI databases 606, optionally via respective core network functions. If it is determined that network slice A is not provided by the CSP in location B, on the other hand, the anticipation component 602 may obtain the service level impact for network slice A in location B via the anticipation components 608, 610 of the partner CSPs. Finally, the anticipation component 602 may return a response to the UE 110 comprising a list of tuples for each impacted network slice in the NSSAI, wherein each tuple may include an S-NSSAI, a geographical location and a service level impact description, as described above.

As has become apparent from the above, the present disclosure provides a technique for anticipating impacts on service levels of one or more services provided to a UE while the UE moves along a planned route. The presented technique may provide a way to infer how the service level of a set of network slices changes over a large geographical area, and then inform the UE about the expected impact so that automated or manual action can be taken. The technique may in other words allow a UE to be informed beforehand of expected impacts on service levels for various types of services provided by network slices in a mobile communication system so that the UE may take preventive actions, such as informing the user, choosing another route, proactively buffer content, and the like. The technique presented herein may as such provide a standardized mechanism which makes use of network slice information of mobile communication networks to thereby provide accurate information on service degradation and inform UEs about network slicing changes (and, consequently, network service level changes) over large geographical areas.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for anticipating impacts on service levels of one or more services provided to a User Equipment, UE, while the UE moves along a planned route, each of the one or more services being provided to the UE using a network slice in a network slicing based mobile communication system, the method being performed by an anticipation component and comprising:

receiving a service level anticipation request for the planned route of the UE;

triggering determining an expected impact on the service levels of the one or more services at one or more locations of the planned route;

triggering sending a response to the service level anticipation request including information on the expected impact on the service levels to the UE, wherein the response comprises a list of entries, each entry of the list of entries contains a network slice identifier associated with a location in which the impact is expected to occur, wherein the information on the expected impact on the service levels included in the response to the service level anticipation request comprises, for each of the one or more services for which a negative impact on a first service level is determined in at least one geographical region, an indication of the at least one geographical region and an indication of the expected negative impact on the first service level of the respective service in the at least one geographical region; and transmitting, to the UE, information to enable mitigating the negative impact on the service level in the area ahead of the UE, wherein the information to enable mitigating the negative impact on the service level in the area ahead of the UE is associated with downloading data to be provided to the UE before the UE enters the area on which the first service level is disrupted.

2. The method of claim 1, wherein the expected impact on the service levels is determined based on network slice selection information of the UE defining, for each of the one or more services, a network slice to be used for providing the respective service to the UE while the UE moves along the planned route.

3. The method of claim 2, wherein the network slice selection information corresponds to a Network Slice Selection Assistance Information, NSSAI, which includes, for each network slice to be used for providing the respective service to the UE, a Single Network Slice Selection Assistance Information, S-NSSAI, defining the respective network slice.

4. The method of claim 2, wherein the network slice selection information is included in the service level anticipation request.

5. The method of claim 1, wherein determining the expected impact on the service levels includes determining, for each pair among the one or more services and the one or more locations, an expected impact on the service level of the respective service at the respective location.

6. The method of claim 1, wherein determining the expected impact on the service levels includes accessing one or more databases storing information on network slices and service levels associated with the network slices in different geographical regions.

7. The method of claim 1, wherein the anticipation component is associated with a service provider providing the one or more services to the UE, wherein determining the expected impact on the service levels includes obtaining information on the expected impact on the service levels from at least one anticipation component associated with another service provider providing the one or more services to the UE while the UE moves along the planned route.

8. The method of claim 1, wherein the anticipation component is implemented in one of:
a Network Function, NF, of the mobile communication system, and
a server external to the mobile communication system.

9. The method of claim 1, wherein the UE is a vehicle connected to the mobile communication system.

10. A computing unit configured to execute an anticipation component for anticipating impacts on service levels of one or more services provided to a User Equipment, UE, while the UE moves along a planned route, wherein each of the one or more services is provided to the UE using a network slice in a network slicing based mobile communication system, the computing unit comprising at least one processor and at least one memory, the at least one memory containing instructions executable by the at least one processor such that the anticipation component is operable to perform the method of claim 1.

* * * * *